(12) United States Patent
Hsueh

(10) Patent No.: US 8,419,230 B2
(45) Date of Patent: Apr. 16, 2013

(54) LENS AND LAMP USING THE SAME

(75) Inventor: Han-Tsung Hsueh, New Taipei (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 37 days.

(21) Appl. No.: 13/175,880

(22) Filed: Jul. 3, 2011

(65) Prior Publication Data

US 2012/0044696 A1     Feb. 23, 2012

Related U.S. Application Data

(60) Provisional application No. 61/375,860, filed on Aug. 22, 2010.

(30) Foreign Application Priority Data

Dec. 6, 2010  (TW) ................................ 99142397 A

(51) Int. Cl.
*F21V 5/04* (2006.01)
*F21V 5/00* (2006.01)

(52) U.S. Cl.
USPC ................................. 362/311.02; 362/311.01

(58) Field of Classification Search ............ 362/311.01–311.15, 355, 368; 313/110–113
See application file for complete search history.

(56) References Cited

U.S. PATENT DOCUMENTS 2,224,178 A * 12/1940 Bitner ........................... 362/337
7,222,995 B1 * 5/2007 Bayat et al. ................... 362/327
7,329,029 B2    2/2008 Chaves et al.

FOREIGN PATENT DOCUMENTS

| EP | 2031296 | 3/2009 |
|---|---|---|
| JP | 2006-302863 | 11/2006 |
| JP | 2008-177964 | 7/2008 |
| JP | 2008-192609 | 8/2008 |

OTHER PUBLICATIONS

"Office Action of Japan Counterpart Application", issued on Oct. 16, 2012, p. 1-p. 2, in which the listed references were cited.

* cited by examiner

*Primary Examiner* — Karabi Guharay
*Assistant Examiner* — Nathaniel Lee
(74) *Attorney, Agent, or Firm* — Jianq Chyun IP Office

(57) ABSTRACT

A lens and a lamp using the same are provided. The lamp includes a lampshade, a base, a lens and a light emitting diode light source. The lampshade is assembled to the base, and the lens is disposed on the base and located in the lampshade. The lens has a first surface, a second surface, a third surface and a fourth surface. The second surface surrounds the first surface to form an accommodating space conformally, and the third surface surrounds the fourth surface and is located on an outer side of the second surface. The first surface is located between the accommodating space and the fourth surface. The light emitting diode light source is disposed in the accommodating space of the lens.

11 Claims, 5 Drawing Sheets

LENS AND LAMP USING THE SAME

CROSS-REFERENCE TO RELATED APPLICATION

This application claims the priority benefit of U.S. Provisional Application Ser. No. 61/375,860, filed on Aug. 22, 2010. This application also claims the priority benefit of a Taiwan application serial no. 99142397, filed on Dec. 6, 2010. The entirety of each of the above-mentioned patent applications is hereby incorporated by reference herein and made a part of this specification.

BACKGROUND OF THE INVENTION

1. Field of the Invention

The invention relates to a lamp and more particularly to a lens and a lamp using the same.

2. Description of Related Art

Having advantages such as compact volume and long lifespan, a light emitting diode (LED) light source has become a commonly adopted light source in daily life.

In the application of the conventional LED light source, as the LED light source is a light source with directivity, a directly illuminated region located in front of the LED light source usually has a higher illumination level and the illumination level of the non-directly illuminated region is lower than that of the directly illuminated region. Due to the directivity of the LED light source, the LED light source is mostly adopted in lamps requiring partial high illumination instead of in decorative illumination.

SUMMARY OF THE INVENTION

The invention is directed to a simply constructed and low-cost lens.

The invention is directed to a decorative lamp adopting a light emitting diode (LED) as a light source.

The invention is directed to a lens having a first surface, a second surface, a third surface, and a fourth surface. The second surface surrounds the first surface to form an accommodating space conformally. The third surface which is a concave surface surrounds the fourth surface and is located on an outer side of the second surface. The first surface is located between the accommodating space and the fourth surface.

In one embodiment of the lens of the invention, the first surface and the second surface are convex surfaces, and the third surface and the fourth surface are concave surfaces.

In one embodiment of the lens of the invention, the third surface has a refractive portion and a total reflective portion. The refractive portion is relatively close to the first surface and the total reflective portion is relatively close to the fourth surface.

In one embodiment of the lens of the invention, at least one of the third surface and the fourth surface further has a microstructure configured to adjust a path of light.

In one embodiment of the lens of the invention, the lens further includes a plurality of fixing portions connected to a bottom edge of the third surface.

The invention is further directed to a lamp including a lampshade, a base, a lens mentioned above, and an LED light source. The lampshade is assembled to the base. The lens is disposed on the base and located in the lampshade. The LED light source is located in the accommodating space of the lens.

In one embodiment of the lamp of the invention, the fixing portions located on the bottom edge of the third surface of the lens are connected to the base. The lamp further includes a plurality of fasteners passing through the fixing portions to fix the lens on the base.

In one embodiment of the lamp of the invention, the lamp further includes an adhesive layer disposed between the fixing portions and the base.

In light of the foregoing, the lens of the invention is simply constructed and has low cost. By applying the lens in lamps, the light path of the LED light source can be changed, so that the LED light source can also be adopted in decorative lamps.

In order to make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
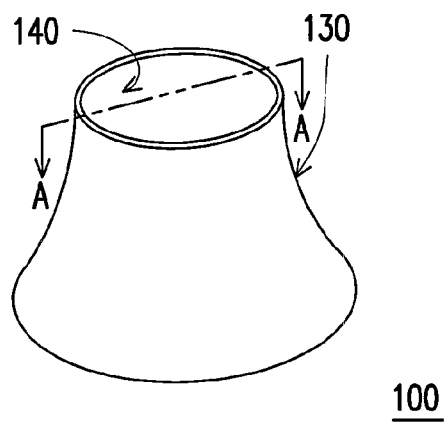
FIGS. 1 and 2 are schematic diagrams of a lens from different viewing angles according to an embodiment of the invention.
Figure 2:
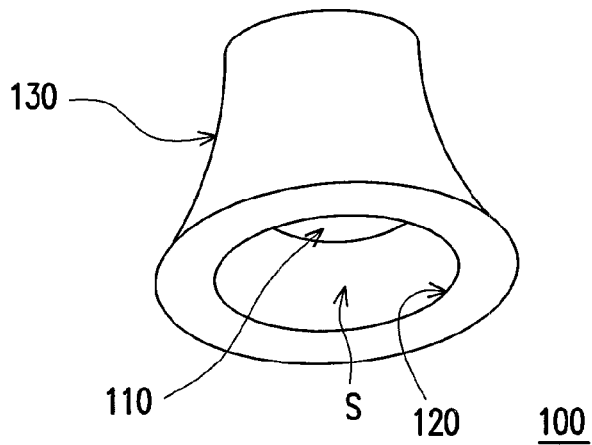
Figure 3:
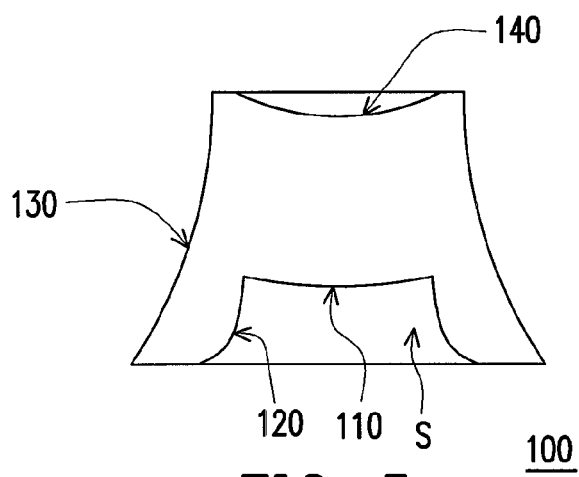
FIG. 3 is a cross-sectional diagram of the lens in FIG. 1 taken along line A-A.

FIGS. 1 and 2 are schematic diagrams of a lens from different viewing angles according to an embodiment of the invention. FIG. 3 is a cross-sectional diagram of the lens in FIG. 1 taken along line A-A. Referring to FIGS. 1, 2, and 3, a lens 100 of the present embodiment has a first surface 110, a second surface 120, a third surface 130, and a fourth surface 140. The second surface 120 surrounds the first surface 110 to form an accommodating space S conformally. The third surface 130 surrounds the fourth surface 140 and is located on an outer side of the second surface 120. The first surface 110 is located between the accommodating space S and the fourth surface 140.

Accordingly, the first surface 110 and the second surface 120 of the lens 100 are convex surfaces, and the third surface 130 and the fourth surface 140 are concave surfaces in the present embodiment.

Figure 4:
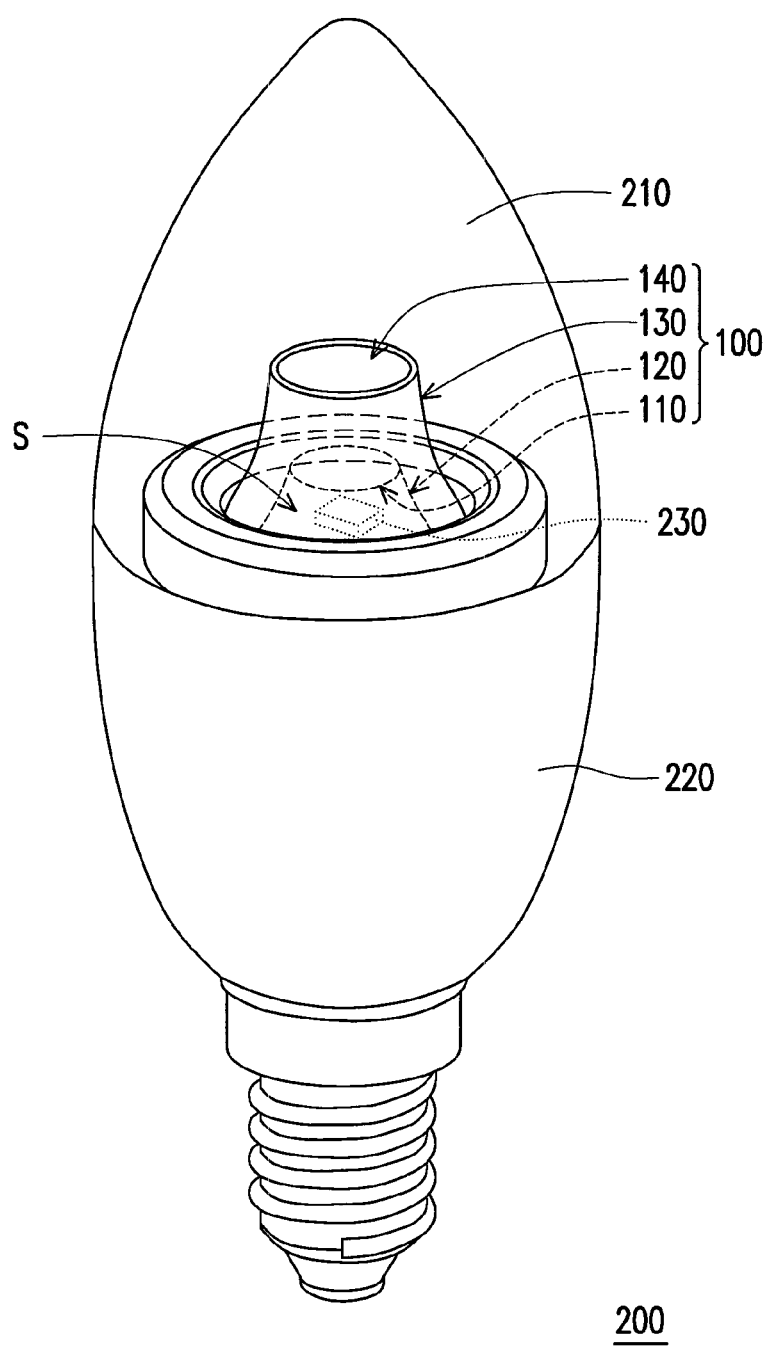
FIG. 4 is a schematic diagram of a lamp adopting the lens in FIG. 1.

FIG. 4 is a schematic diagram of a lamp adopting the lens in FIG. 1. Referring to FIGS. 2, 3, and 4, the lens 100 is applied in a decorative lamp 200. The lamp 200 includes a lampshade 210, a base 220, a lens 100, and a light emitting diode (LED) light source 230. The lampshade 210 is assembled to the base 220. The lampshade 210 can be of any shape depending on the demand of the decorative lamp 200. The lens 100 is disposed on the base 220 and located in the lampshade 210. The LED light source 230 is located in the accommodating space S of the lens 100.

Figure 5:
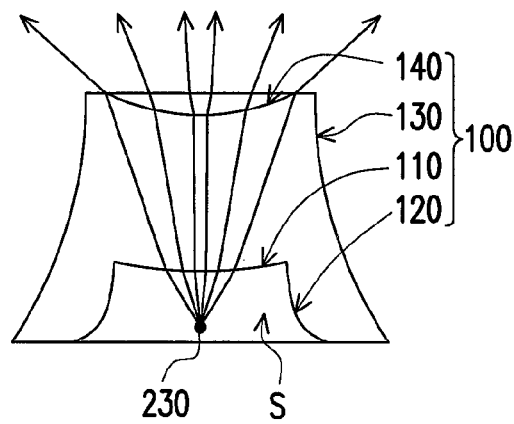
FIGS. 5 to 7 are schematic diagrams showing an adjustment of a light emitted by a light emitting diode light source through the lens.
Figure 6:
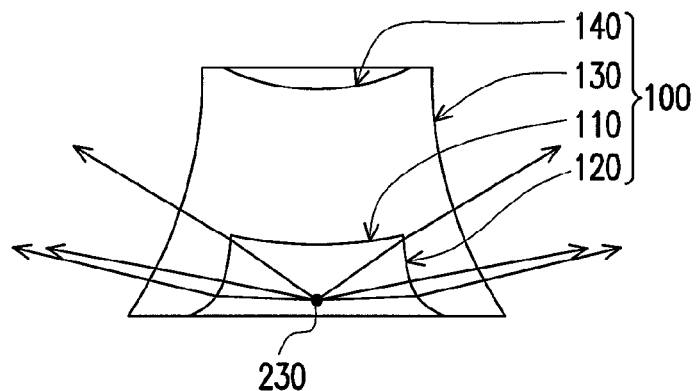
Figure 7:
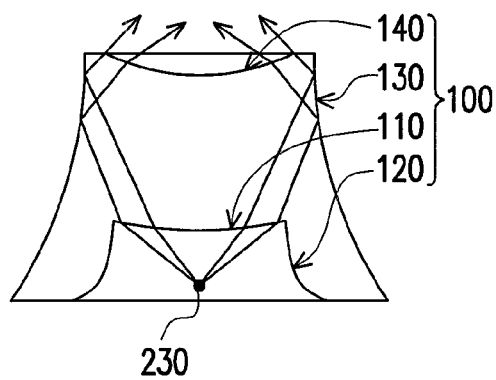

FIGS. 5 to 7 are schematic diagrams showing an adjustment of a light emitted by a light emitting diode light source through the lens. For better illustration, FIGS. 5-7 merely show the LED light source 230, the lens 110, and a light path of the LED light source 230 after being adjusted through the lens 100. Referring to FIG. 5, a light emitted by the LED light source 230 disposed in the accommodating space S of the lens 100 facing the first surface 110 is limited by the directivity of the LED light source 230, and thus has a narrow visible range. However, the first surface 110 of the lens 100 is neither planar nor inclined. The first surface 110 is a surface with curvature, such that the light emitted from the LED light source 230 enters the lens 100 through the first surface 110, and the light is refracted by the curvature of the first surface 110 so as to increase the visible range of the light. Moreover, the light entering the lens 100 through the first surface 110 is emitted due to the refraction through the curved fourth surface 140. Consequently, the visible range of the light emitted by the LED light source 230 is further widened.

Referring to FIG. 6, the light emitted by the LED light source 230 facing the second surface 120 is refracted by the curved second surface 120. The light is then emitted out of the lens 100 through the curved third surface 130. Notably, the light refracted from the second surface 120 is emitted from a lower portion of the third surface 130.

Referring to FIG. 7, the light having a larger angle and emitted from the LED light source 230 enters the lens 100 from the first surface 110, and is emitted to a higher portion of the third surface 130. At this time, a total reflection occurs and the light is reflected and emitted from the fourth surface 140. Accordingly, the easily refracted lower portion of the third surface 130 relatively close to the first surface 110 is referred as a refractive portion, and the easily total reflected higher portion of the third surface 130 relatively close to the fourth surface 140 is referred as a total reflective portion. Here, the refractive portion and the total reflective portion are generally divided. Each of the refractive portions and the total reflective portions used in the lens 100 of the lamp 200 can be changed according to a location of the LED light source 230 disposed in the accommodating space S.

Figure 8:
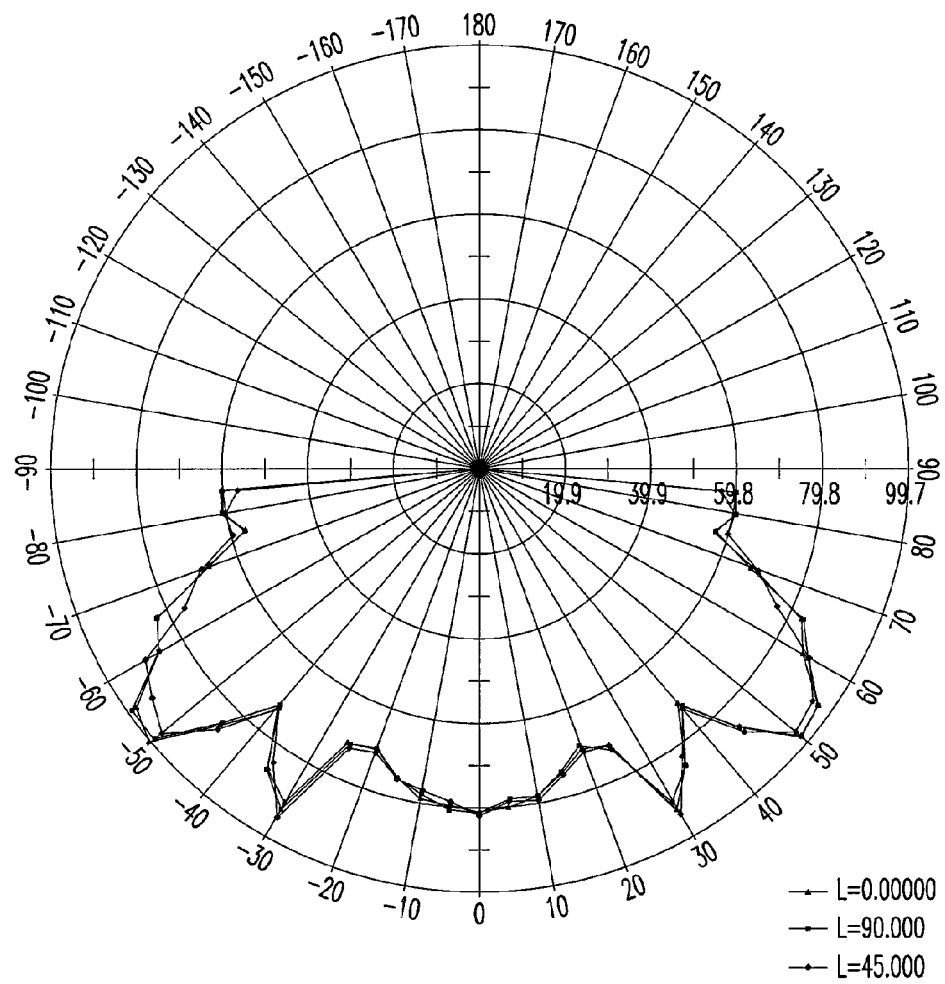
FIG. 8 is an illumination distribution diagram of the lamp after normalizing different illumination standards.

FIG. 8 is an illumination distribution diagram of the lamp after normalizing different illumination standards. As shown in FIG. 8, the lens 100 is adopted in lamp 200, so that a visible angle range of the lamp 200 is approximately from −85° to +85°. That is, the lamp 200 has a visible angle range of 170°. In addition, the lamp 200 has uniform illumination within the visible angle range, such that the non-uniform illumination of conventional decorative lamps applying the LED light source 230 having directivity is adjusted.

Further, a micro-structure (not shown) is formed on at least one of the third surface 130 and the fourth surface 140. The disposition of the micro-structure facilitates in adjusting the path of light so as to avoid glare.

Figure 9:
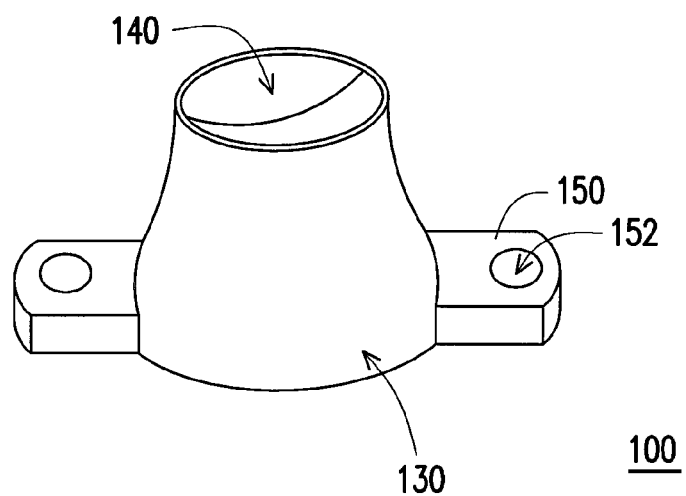
FIG. 9 is a schematic diagram of the lens having a plurality of fixing portions.

FIG. 9 is a schematic diagram of a lens having a plurality of fixing portions. Referring to FIGS. 4 and 9, in order to dispose the lens 100 firmly on the base 220, the lens 100 further includes a fixing portion 150 connected to a bottom edge of the third surface 130. The lamp 200 further includes a plurality of fasteners (not shown) such as screws, and the fasteners are fastened into the base 220 through the fixing portion 150 so as to fix the lens 100 on the base 220. Each fixing portion 150 has an opening 152, and the fastener is fastened into the base 220 through the opening 152.

Figure 10:
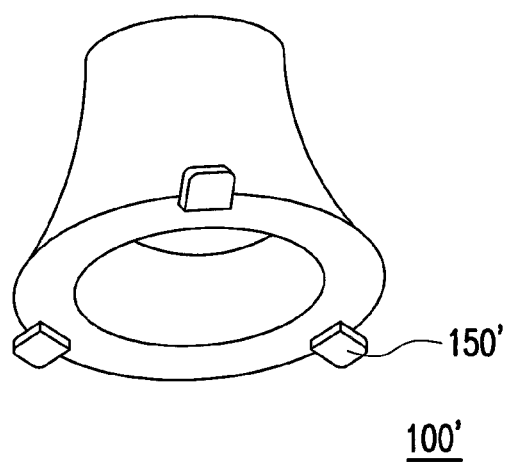
FIG. 10 is a schematic diagram of a lens according to another embodiment.

In another embodiment, a fixing portion 150' lacks the opening 152 (as depicted in FIG. 10), and a lens 100' is disposed on the base 220 through the fixing portion 150'. Herein, the fixing portion 150' and the base 220 have an adhesive layer therebetween for fixing the lens 100' on the base 220. The present embodiment does not limit the manner of fixing the fixing portion 150 on the base 220. In other embodiments not illustrated, a plurality of latches (not shown) is disposed on the base 220. The lens 100 is fixed to the base 220 by screwing the fixing portion 150 to a space between the latches and a surface of the base 220.

In summary, the lens of the invention has a simple structure and is easily fabricated, and thus has low fabrication cost. Furthermore, by adopting the lens with the LED light source having directivity, the visible angle range of the LED light source is enlarged, so that the LED light source can also be applied in decorative lamps to further widen the application scope of the LED light source.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A lens, wherein a light emitting diode light source is adapted to be disposed therein, the lens comprising a first surface, a second surface, a third surface, and a fourth surface, wherein the second surface surrounds the first surface to form an accommodating space conformally, the third surface has a refractive portion and a total reflective portion, the refractive portion is relatively close to the first surface and the total reflective portion is relatively close to the fourth surface, the light emitting diode light source is located in the accommodating space, the third surface surrounds the fourth surface and is located on an outer side of the second surface, and the first surface is located between the accommodating space and the fourth surface, wherein the third surface is a concave surface.

2. The lens as claimed in claim 1, wherein each of the first surface and the second surface is a convex surface, and the fourth surface is a concave surface.

3. The lens as claimed in claim 1, wherein at least one of the third surface and the fourth surface further has a micro-structure configured to adjust a path of light.

4. The lens as claimed in claim 1, further comprising a plurality of fixing portions connected to a bottom edge of the third surface.

5. A lamp, comprising:
 a lampshade;
 a base, assembled to the lampshade;
 a lens, disposed on the base and located in the lampshade, having a first surface, a second surface, a third surface, and a fourth surface, wherein the second surface surrounds the first surface to form an accommodating space conformally, the third surface surrounds the fourth surface and is located on an outer side of the second surface, the first surface is located between the accommodating space and the fourth surface and the third surface is a concave surface; and
 a light emitting diode light source, disposed in the accommodating space of the lens.

6. The lamp as claimed in claim 5, wherein each of the first surface and the second surface is a convex surface, and the fourth surface is a concave surface.

7. The lamp as claimed in claim 5, wherein the third surface has a refractive portion and a total reflective portion, wherein the refractive portion is relatively close to the first surface and the total reflective portion is relatively close to the fourth surface.

8. The lamp as claimed in claim 5, wherein at least one of the third surface and the fourth surface further has a microstructure configured to adjust a path of light.

9. The lamp as claimed in claim 5, further comprising a plurality of fixing portions connected to a bottom edge of the third surface and connected to the base.

10. The lamp as claimed in claim 9, further comprising a plurality of fasteners passing through the fixing portions to fix the lens on the base.

11. The lamp as claimed in claim 9, further comprising an adhesive layer disposed between the fixing portions and the base.

* * * * *